United States Patent [19]
White

[11] Patent Number: 5,346,566
[45] Date of Patent: * Sep. 13, 1994

[54] WATER BARRIER OF WATER-SWELLABLE CLAY OR OTHER ABRASIVE MATERIAL SANDWICHED BETWEEN INTERCONNECTED LAYERS OF FLEXIBLE FABRIC SEWN OR NEEDLED TOGETHER USING A LUBRICANT AND/OR A LIQUID ADHESIVE

[75] Inventor: Alec W. White, Hoffman Estates, Ill.

[73] Assignee: American Colloid Company, Arlington Heights, Ill.

[*] Notice: The portion of the term of this patent subsequent to Dec. 16, 2009 has been disclaimed.

[21] Appl. No.: 990,988

[22] Filed: Dec. 16, 1992

Related U.S. Application Data

[63] Continuation-in-part of Ser. No. 628,497, Dec. 17, 1990, Pat. No. 5,174,231.

[51] Int. Cl.⁵ .............. B01D 39/00; B32B 5/06; B32B 5/16; B32B 5/26; B32B 5/30; B32B 7/08; B32B 31/16; C02F 1/42; D04H 1/111
[52] U.S. Cl. .................. 156/71; 52/169.1; 52/309.13; 52/309.14; 55/528; 55/DIG. 9; 156/148; 156/305; 156/308.2; 210/679; 210/688; 210/807; 210/502.1; 210/503; 210/507; 210/508; 210/901; 210/912; 405/53; 405/107; 405/109; 405/115; 405/129; 405/270; 428/102; 428/120; 428/206; 428/234; 428/235; 428/241; 428/244; 428/246; 428/283; 428/296; 428/300
[58] Field of Search ............. 52/169.1, 309.13, 309.14; 55/528; 156/71, 148, 305, 308.2; 210/502.1, 503, 507, 508; 405/38, 53, 107, 109, 115; 428/102, 120, 206, 234, 235, 241, 244, 246, 283, 296, 300

[56] References Cited

U.S. PATENT DOCUMENTS

| | | | |
|---|---|---|---|
| 4,423,109 | 12/1983 | Greenman et al. | 428/288 |
| 4,424,248 | 1/1984 | Tesch et al. | 428/172 |
| 4,495,235 | 1/1985 | Tesch | 428/137 |
| 4,530,869 | 7/1985 | Tesch | 428/69 |
| 4,565,468 | 1/1986 | Crawford | 405/270 |
| 4,603,075 | 7/1986 | Dergarabedian et al. | 428/235 |
| 4,622,260 | 11/1986 | Tesch | 428/173 |
| 4,837,085 | 6/1989 | McGroarty | 421/451 |
| 4,849,273 | 7/1989 | Skinner et al. | 428/102 |
| 5,112,665 | 5/1992 | Alexander | 428/236 |
| 5,174,231 | 12/1992 | White | 112/420 |
| 5,237,945 | 8/1993 | White | 112/420 |

FOREIGN PATENT DOCUMENTS

| | | |
|---|---|---|
| 1247347 | 12/1988 | Canada. |
| 0071213 | 2/1983 | European Pat. Off.. |
| 0278419 | 8/1988 | European Pat. Off.. |
| 0379466 | 7/1990 | European Pat. Off.. |
| 2151912 | 7/1985 | United Kingdom. |
| 2184195 | 5/1988 | United Kingdom. |
| 2202185 | 10/1990 | United Kingdom. |

*Primary Examiner*—James C. Cannon
*Attorney, Agent, or Firm*—Marshall, O'Toole, Gerstein, Murray & Borun

[57] ABSTRACT

A multi-layer article of manufacture includes an intermediate layer of a water-swellable colloidal clay, such as bentonite, sandwiched between two layers of flexible sheet or fabric material wherein the two flexible layers of sheet or fabric material are structurally interconnected through the intermediate clay layer, such as by needle punching, after lubrication of the clay surface with a liquid, such as water, to interconnect fibers of one fabric layer to the other fabric layer at spaced locations over essentially the entire inner surface areas of both sheet or fabric material layers. In a preferred embodiment, a water-insoluble adhesive is applied to at least one of the fabric layers to lock the interconnecting fibers in place and substantially increase the structural integrity, particularly the shear strength, of the article.

30 Claims, 2 Drawing Sheets

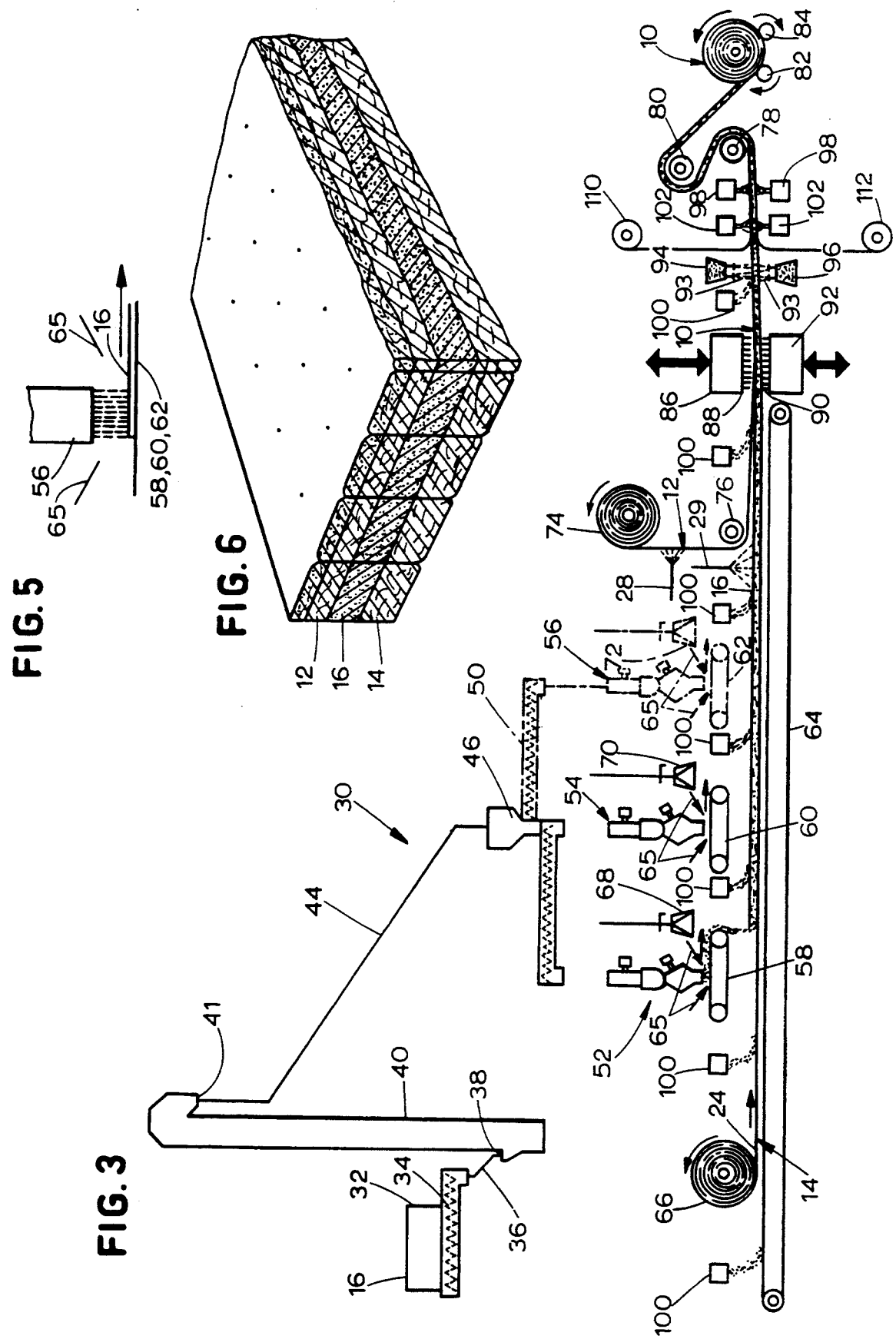

WATER BARRIER OF WATER-SWELLABLE CLAY OR OTHER ABRASIVE MATERIAL SANDWICHED BETWEEN INTERCONNECTED LAYERS OF FLEXIBLE FABRIC SEWN OR NEEDLED TOGETHER USING A LUBRICANT AND/OR A LIQUID ADHESIVE

CROSS REFERENCE TO RELATED APPLICATION

This application is a continuation-in-part of application Ser. No. 07/628,497, filed Dec. 17, 1990, now U.S. Pat. No. 5,174,231.

FIELD OF THE INVENTION

The present invention is directed to a multi-layer article of manufacture useful as a waterproofing membrane for waterproofing surfaces such as soil, and plaza decks, in the formation of waterproofed construction areas, soil structures, such as lagoons, hazardous or toxic waste containment areas, subterranean foundation surfaces and the like. More particularly, the present invention is directed to a multi-layer waterproofing article of manufacture including a layer of powdered or granular water-swellable clay, such as bentonite, surrounded by upper and lower contacting layers of flexible fabric materials, such as geotextile fabrics, interconnected at spaced locations, such as by needle punching or sewing, to provide a structurally sound spacing and interconnection between the flexible fabric materials. The spacing between the fabric layers is defined by a thickness of an intermediate layer of powdered or granular abrasive material, such as water-swellable clay material. The fabric layers are water-permeable, if not initially, by virtue of their being punctured during the manufacture of the multi-layer article of manufacture but do not require an adhesive in contact with the water-swellable clay layer to structurally secure the water-swellable clay to the upper and lower fabric layers.

In one embodiment, the method of manufacture includes interconnecting the upper and lower fabric layers, at least one of which is a non-woven fabric, the other being either a woven or non-woven fabric, by needle punching, to interconnect fibers of one fabric layer to the fibers of the other fabric layer, and optionally, while maintaining sufficient fabric porosity, in at least one fabric layer, to permit the intermediate water-swellable clay layer to extrude from the interior of the article to an exterior surface of the article, thereby creating a sealing layer of water-swellable clay capable of sealing at overlaps and seams between adjacent articles. Alternatively, the two spaced fabric layers can be either woven or non-woven or one woven and one non-woven and the two fabric layers can be secured together, surrounding the clay layer, by sewing. The multi-layer article of manufacture of the present invention can maintain a relatively heavy, uniform thickness of water-swellable clay between the fabric layers without the necessity of application of adhesive on the major inner surfaces of the fabric layers. Where desirable, adhesive can be applied to the edges of the article to prevent the water-swellable clay from falling out of the edges of the article.

In accordance with one important embodiment of the present invention, a coating of a water-insoluble adhesive is applied over one or both major outer surfaces, particularly over the outer surface of the woven textile that is retaining fibers from the spaced non-woven textile layer as a result of needle punching. Surprisingly, a relatively light coating, e.g., about 0.001 gm to about 50.0 gm/ft$^2$, preferably about 0.01 to about 15.0 gm/ft$^2$ water-insoluble adhesive emulsion over the outer surface of the woven textile layer increases the tensile strength of the needle-punched waterproofing articles by at least 10 times and usually about 15 times to prevent one textile layer from sliding with respect to the other textile layer, which is particularly beneficial when installed on sloping terrain. In other embodiments, water-impermeable layers can be adhered to one or both exterior surfaces of the fabric to provide additional or safety layers of impermeability.

BACKGROUND OF THE INVENTION

Various polymers, swellable clays, and articles of manufacture have been applied to the surface of soil to provide a waterproofing layer to prevent the penetration of water and hazardous or toxic materials into the earth, and to provide lagoons, ponds and other water containment areas. Water-swellable clays, such as bentonite, have been applied directly to the soil surface and impacted in place, as disclosed in this assignee's prior U.S. Pat. No. 3,986,365. In addition, many different multi-layered articles of manufacture containing a water-swellable clay, such as bentonite, have been manufactured by adhesively securing the water-swellable clay to major interior surfaces of flexible sheet materials for application to the soil surface in abutting or overlapping relation of adjoining multi-layered articles. Examples of flexible sheet materials containing adhesively secured water-swellable clays are found in the following U.S. Patents: Clem U.S. Pat. No. 4,467,015; Clem U.S. Pat. No. 4,501,788; McGroarty, et al. U.S. Pat. No. 4,693,923; Harriett U.S. Pat. No. 4,656,062; and Harriett U.S. Pat. No. 4,787,780.

U.K. published patent application GB 2,202,185A discloses a layer of water-swellable bentonite between flexible layers that have been needle punched together in a needle loom that secures material from a lower layer of non-woven textile material to an upper layer of non-woven textile material, and secures material from an upper non-woven textile material to the lower non-woven textile material.

Another waterproofing barrier, disclosed in Blias U.S. Pat. No. 4,344,722, is constructed in the field by applying a first flexible, water-permeable fabric layer, overlaying a thickness of water-swellable clay material and applying an overlayer of the same flexible, water-permeable fabric thereover. Other patents disclosing the use of water-impermeable layers for protecting a soil surface include British Patent Specification 1,059,363; British Patent Specification 1,029,513 and British Patent Specification 1,129,840.

German patent DE 30 04 503 C2 discloses an article having two fabric layers including one non-woven fabric, surrounding a bentonite clay layer wherein the two fabric layers are needle punched together. Crawford U.S. Pat. No. 4,565,468 discloses an article including two fabric layers surrounding a bentonite clay layer wherein the two fabric layers are quilted together in a pattern forming four sided compartments.

While the Blias waterproofing barrier does not require the use of adhesive because the multiple layers are assembled at their final location, this at-site assembly is disadvantageous because of the increased man hours necessary to construct the barrier at the site and because of the attendant difficulty in applying a uniform thickness of the water-swellable clay over the lower fabric layer with relatively crude construction equipment.

The disadvantages of adhesively affixing the water-swellable clay to upper and lower fabric layers over their full internal, major surface areas or assembling a multi-layer article at the site of application are overcome in accordance with the principles of the present invention, as will be described in more detail hereinafter.

SUMMARY OF THE INVENTION

In brief, the present invention is directed to a multi-layer article of manufacture including an intermediate layer of a water-swellable colloidal clay, such as bentonite, sandwiched between two layers of flexible sheet or fabric material wherein the two flexible layers of sheet or fabric material are structurally interconnected to surround the intermediate clay layer, such as by needle punching or sewing, preferably by needle punching, at spaced locations over essentially the entire inner surface areas of both sheet or fabric material layers.

In the preferred embodiment, at least one major outer surface of one of the fabric layers, preferably the outer surface of the woven fabric layer, is coated with a water-insoluble adhesive, after needle punching the spaced fabric layers together surrounding the intermediate water-swellable clay, e.g., sodium bentonite, layer to provide a surprising increase in tensile properties, particularly shear strength of the multi-layer article. The water-insoluble adhesive is applied in liquid form preferably suspended in an aqueous carrier, in an amount of at least about 0.001 gm, preferably at least about 0.01 gm/ft$^2$ of fabric surface area, more preferably at least about 0.1 gm/ft$^2$, and can be applied to one or both major outer surfaces of the fabric layers. Preferably, the adhesive is applied in an amount such that the adhesive does not completely penetrate the fabric layer(s) to contact the intermediate clay layer, e.g., about 0.01 gram to about 15.0 gm/ft$^2$ of outer fabric surface area coated. The adhesive should be water-insoluble after drying on the surface of the fabric layer (dissolves less than 0.5 gram in 100 ml. of water) so that upon water contact, the additional tensile and shear strength imparted by the adhesive is not lost. When the fabric layers are secured together by needle punching, in accordance with the preferred embodiment, at least one of the fabric layers should be a non-woven fabric.

In accordance with an important feature of one embodiment of the present invention, the bentonite clay/needle interface, at the surface of the clay penetrated by a needle during securement of the two fabric layers, is wetted with water or other liquid lubricant, e.g., water, or aqueous solutions containing a lubricant, such as a glycol, to provide easier needle penetration with less needle wear and/or needle breakage; quicker and more efficient manufacture; and a more compact, tighter product that has an unexpectedly more consistent, even thickness of clay over the entire fabric area covered with clay. In accordance with one important embodiment of the present invention, the upper and lower fabric layers are interconnected by needle punching wherein a plurality of fibers or filaments or strands of material are dislodged from a (e.g., upper) non-woven fibrous layer, forcing the fibrous material through the intermediate water-swellable clay layer and into the other (e.g., lower) fabric layer. The fibers, filaments or strands of material from the non-woven layer are interconnected to the lower layer requiring only one non-woven fabric layer and, optionally, fibers from a lower non-woven layer are needle-punched into the upper layer, requiring both fabric layers to be non-woven.

In the preferred embodiment, the fabric layer that receives fiber from the other fabric layer, e.g., the woven fabric layer, is coated with an adhesive over its outer surface in an amount sufficient to aid in binding the layer-extraneous fibers within the coated fabric layer, e.g., about 0.01 gram to about 15.0 grams of adhesive solution or dispersion per square foot of fabric surface area. Optionally, both fabric layers can be coated with adhesive. If both fabric layers are non-woven fabrics and needle punching is performed on both fabric layers, both outer fabric surfaces can be coated with the adhesive to bind the needle-punched fibers within both fabric layers.

Accordingly, one aspect of the present invention is to provide a new and improved multi-layer article of manufacture including upper and lower flexible sheet or fabric materials, at least one of which is non-woven, and an intermediate layer of a water-swellable clay, wherein the upper and lower sheet or fabric layers are structurally interconnected by interconnecting fibers or filaments or strands of flexible material from one non-woven fabric layer to the other fabric layer while lubricating a surface of the water-swellable clay at a surface first penetrated with needles, or directly beneath the non-woven layer, and without requiring an adhesive contacting the major internal surfaces of the sheet or fabric layers to provide structural integrity.

Another aspect of the present invention is to provide a method of needle punching, sewing or quilting two flexible fabrics together, surrounding a consistent thickness of a water-swellable clay or other layer of powdered or granular abrasive material by wetting a needle-penetrated surface of the clay or other abrasive material between the two fabric layers at a surface penetrated by the sewing or needle-punch needles. Wetting prior to needle-punching lubricates the abrasive material prior to needle penetration, thereby reducing needle breakage and vibration of the article during manufacture, while densifying the abrasive particles by water absorption, at least on the surface of the abrasive particle layer, to substantially reduce movement of the clay layer during manufacture, thereby maintaining an even thickness of abrasive material between the fabric layers through completion of manufacture. One or both outer surface layers of the sewn or needle-punched articles can be coated with an adhesive to better adhere the two spaced fabric layers together via adhesively binding the interconnecting fibers. Again, in the preferred embodiment, the adhesive should be a water-insoluble adhesive from an aqueous suspension or from a non-aqueous solution in an amount that will not completely penetrate the fabric layer(s) so that the adhesive solution or emulsion does not contact the intermediate layer of abrasive material, e.g., about 0.01 gram to about 15.0 gm/ft$^2$ of surface area coated.

Another aspect of the present invention is to provide a new and improved, more compact multi-layer article of manufacture including an intermediate layer of water-swellable colloidal clay material sandwiched between contacting upper and lower layers of a water-permeable flexible sheet of fabric material, where the upper and lower sheets of fabric material may be the same or different, at least one of which is a non-woven fabric, and coating the outer surface of at least one of the fabrics with an adhesive to bind the fibers from the other fabric layer.

Still another aspect of the present invention is to provide a new and improved waterproofing membrane, capable of holding water above and/or below the membrane, such that water permeates the membrane at a rate of $1 \times 10^{-7}$ cm/sec or less, wherein the membrane includes a pair of flexible sheet or fabric layers surrounding an intermediate water-swellable clay layer, wherein the fabric layers are structurally interconnected by needle punching, sewing or quilting, or needle looming, while lubricating the needle penetration into the intermediate clay layer such that the membrane can be manufactured as a completed multi-layer membrane in roll form with significantly less needle wear and/or breakage, while maintaining an even thickness of clay between the fabric layers.

A further aspect of the present invention is to provide a new and improved multi-layer article of manufacture including a pair of flexible sheet material layers having a layer of powdered or granular abrasive material, such as a water-swellable clay and/or a liquid-interacting material therebetween, wherein the active material is selected from the group consisting of a water-swellable clay, an organophilic clay, a zeolite, a water-soluble contaminant absorbent, a water-soluble contaminant adsorbent, an ion-exchange material, a water-soluble contaminant reactant, a water-soluble contaminant neutralizing material, and mixtures thereof in separate or intermixed layers, by sewing, quilting or needle punching the two fabric layers together surrounding the abrasive material after first wetting a needle-penetrated surface of the abrasive material.

Another aspect of the present invention is to provide a multi-layer article of manufacture including two fabric layers sewn or needle punched together surrounding an intermediate layer of a powdered or granular abrasive material, wherein at least one of the fabric layers is coated with an adhesive solution or dispersion on its outer surface to provide increased structural integrity to the article and to minimize or eliminate shifting of one fabric layer with respect to the other fabric layer when the article is installed over a sloped surface. The adhesive provides additional structural integrity for added durability particularly for handleability and installation and extends the useful life of the product.

Still another aspect of the present invention is to provide a multi-layer article of manufacture wherein two spaced fabric layers, at least one of which is a non-woven fabric are needle punched together surrounding an intermediate layer of a powdered or granular abrasive material, such as a water-swellable clay layer, e.g., sodium bentonite, after first lubricating an outer surface of the intermediate layer adjacent to a non-woven fabric layer with an aqueous solution of a water-soluble adhesive, to both lubricate the needle penetration from the non-woven fabric layer, through the intermediate layer, and to stiffen the article upon adhesive drying, for easier installation and to prevent sagging when installed over a non-uniform earthen surface.

The above and other aspects and advantages of the present invention will become apparent from the following detailed description of the present invention taken in conjunction with the drawings.

BRIEF DESCRIPTION OF THE DRAWINGS

FIG. 3 is a schematic flow diagram of the manufacturing process for the water barrier of the present invention;

FIG. 5 is a partially broken away side view of a portion of the process and apparatus of FIG. 3, showing lubricant being sprayed onto falling powdered or granular abrasive material as the abrasive material is applied to a lower fabric layer; and FIG. 6 is a partially broken away side view of the preferred multi-layer article of the present invention showing an adhesive applied over an outer surface of the upper fabric layer that aids in binding needle-punched fibers derived from the lower fabric layer to unexpectedly increase the structural integrity of the multi-layer article.

DETAILED DESCRIPTION OF THE PREFERRED EMBODIMENTS

Figure 1:
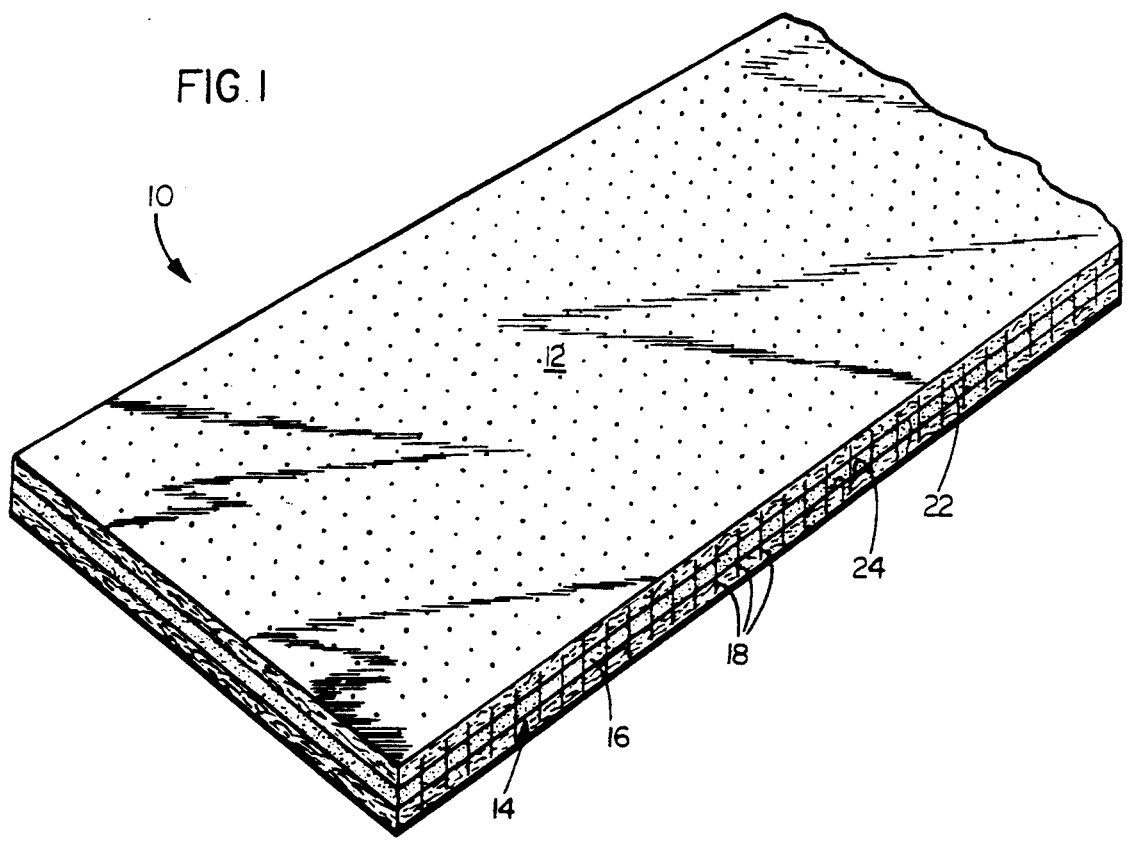
FIG. 1 is a partially broken-away perspective view of the multi-layer water barrier of the present invention.
Figure 2:
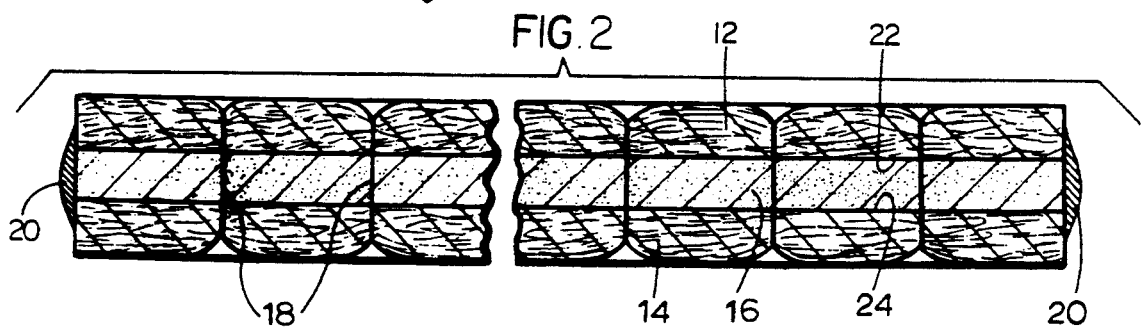
FIG. 2 is a partially broken-away perspective view of the multi-layer water barrier of the present invention, including an adhesive applied at the edges to prevent loss of water-swellable clay during handling and installation.

Turning now to the drawings, and initially to FIG. 1, there is illustrated a multi-layer article of manufacture, generally designated by reference numeral 10 useful as a waterproofing material including a pair of woven or non-woven flexible sheet material layers, generally designated 12 and 14, having a layer of water-swellable clay 16 sandwiched therebetween. The pair of sheet material layers 12 and 14 are structurally interconnected one to the other, preferably by needle punching, with fibers, filaments or strands of flexible material 18 from one sheet material layer 12 or 14 interconnected to the other sheet material layer 12 or 14 at spaced locations over essentially the entire internal major surfaces 22 and 24 of the sheet material layers 12 and 14. Alternatively, the sheet materials, e.g., fabrics, are secured together by sewing or quilting wherein at least one of the surfaces that is penetrated with the sewing needle has been wetted with water or other lubricant, preferably aqueous, to lubricate the needle penetration and thereby lessen article vibration during manufacture. As shown in FIG. 2, adhesive can be applied along the edges of the multi-layer article of manufacture 10 to prevent some of the clay 16 from falling out of the edges of the multi-layer article of manufacture 10. Further, a water-insoluble adhesive can be applied over one or both major outer surfaces of one or both fabric layers to provide substantial additional bonding of the fibers that interconnect the two fabric layers, as shown in FIG. 6, and as described in more detail hereinafter. In the embodiment shown in FIG. 2, the adhesive 20 is in contact with the clay layer 16 at the edges only, to connect both flexible sheet material layers 12 and 14, to seal the edges and confine the clay 16 between the sheet material layers 12 and 14.

In accordance with an important and unexpected feature of the present invention, it has been found that the flexible sheet material layers 12 and 14 can be needle punched, sewn or otherwise secured together surrounding a layer of water-swellable clay or other abrasive powdered or granular material much more effectively, efficiently and the product can be manufactured such that an even thickness of abrasive material is maintained, while experiencing substantially less needle wear and breakage, by wetting a surface of the abrasive material prior to needle penetration. In accordance with a preferred embodiment, the fabrics are secured together structurally with threads, fibers, filaments or strands of flexible material from one non-woven fabric layer interconnected to the fibers of the other fabric layer at spaced intervals (e.g., 2 to 500 mil spacing) by applying water or other lubricating liquid to the surface of the abrasive material layer, and thereby avoiding substantial needle wear and breakage while manufacturing a tighter, denser product with the opposed fabrics 12 and 14 held tighter together and surrounding a more consistent thickness of abrasive material as a result of less vibration experienced by the product during manufacture.

In accordance with another important feature of the present invention, the multi-layer article of manufacture, manufactured in accordance with the present invention, can be made with essentially no adhesive contacting the major internal surfaces 22 and 24 of flexible sheet material layers 12 and 14 so that the clay layer 16 sandwiched between the flexible sheet material layers 12 and 14 will maintain complete swellability while being an article of manufacture that is sufficiently structurally sound that it can be rolled up after manufacture, without substantial loss of the intermediate clay layer 16.

In accordance with another important and unexpected feature of the present invention, the method of manufacture of the present invention is both more effective and more efficient when the flexible sheet material layers 12 and 14 are structurally interconnected by needle punching, with the threads, fibers, filaments or strands of flexible material 18 from one non-woven fabric layer interconnected to the fibrous material of the other fabric layer, and by pre-wetting an abrasive layer surface prior to needle punching, as by spraying the abrasive layer surface via spray nozzles 28 or 29 disposed across the width of the abrasive material layer, or disposed to spray an under surface of non-woven fabric 22, as shown in FIG. 3. In this manner, the flexible sheet material layers 12 and 14, and the sandwiched or intermediate clay or other powdered or granular abrasive material layer 16 can be provided in a new and unexpectedly consistent thickness throughout the entire article, while achieving structural integrity of an article that has a reduced thickness with the same amount of abrasive material.

In accordance with another important embodiment of the present invention, it has been found that an application of adhesive over one or both outer surfaces of the fabric layer(s), e.g., the woven fabric layer that receives fibers from the other fabric layer, e.g., the non-woven fabric layer, via needle punching, in an amount insufficient to completely penetrate the fabric layer so that the adhesive does not contact the intermediate layer, increases the tensile strength of the multi-layer article at least five fold, and preferably about 10 to about 15 fold.

Turning now to FIG. 3, there is shown a schematic diagram of the method of manufacturing the multi-layered articles of manufacture of the present invention, generally designated by reference numeral 30. A water-swellable colloidal clay, such as bentonite 16, e.g., sodium bentonite, is charged to a clay receiving hopper 32. An auger 34, disposed at a lower end of the receiving hopper 32 and in fluid communication therewith, forces the water-swellable clay through conduit 36 to an inlet 38 of a clay elevator 40. The water-swellable colloidal clay is discharged from the clay elevator 40 at clay elevator outlet opening 41 through conduit 44 into a clay-receiving hopper 46. A pair of augers 48 and 50 in fluid communication with the lower end of hopper 46 force the clay into one, two or three clay feeding mechanisms, generally designated by reference numerals 52, 54 and 56, for feeding the clay in a controlled manner to one, two or three continuous clay feed conveyor belts 58, 60 and 62 successively aligned above an elongated product conveyor belt 64. The clay generally is applied over a lower fabric layer 66 in an amount of about ¼ to about 10 pounds per square foot of fabric surface area preferably about 1 to about 5 pounds per square foot.

A supply of a flexible sheet material in roll form 66 is disposed above the continuous product conveyor belt 64 to provide a continuous supply of flexible sheet material onto an upper surface of the product conveyor belt 64 for receiving a layer of water-swellable clay from one, two or all three of the clay feed conveyor belts 58, 60 and 62. Any one, two or all three of the water-swellable clay feed conveyor belts 58, 60 and 62 can be used to provide one or more layers of water-swellable clay onto an upper surface 24 of the flexible sheet material held on top of the product conveyor belt 64, depending upon the thickness of clay desired in the product. Dust collection suction devices 68, 70 and 72 are disposed near each continuous clay feed conveyor belt 58, 60 and 62 to clear the air of fine clay particles emanating from clay feeding mechanisms 52, 54 and 56. A second roll of flexible sheet material 74 is disposed on a downstream side of the clay feed mechanisms 52, 54 and 56 and above the product conveyor belt 64. The second roll of flexible sheet material 74 is fed by power driven roller 76, power rollers 78 and 80 and wind up rollers 82 and 84 to dispose flexible sheet material layer 12 on top of the clay layer 16 to sandwich the clay layer 16 between lower flexible sheet material layer 14 and upper flexible sheet material layer 12.

In accordance with an important feature of the present invention, needle punching device 86, well known in the art as shown in U.K. published patent application GB 2,202,85A and German Patent DE 30 04 503, is disposed above and below the multi-layer article 10, at a point in the manufacturing process where the upper and lower flexible sheet material layers 12 and 14 have sandwiched the clay layer 16 therebetween, to interconnect the upper and lower sheet material layers 12 and 14 with flexible threads, fibers, filaments or strands of flexible material from one fabric layer to the other fabric layer, as shown by needles 88 on the upper portion of the needle-punching device 86, and needles 90 on the lower portion of the needle-punching device 92. Needles 88 dislodge fibers from the upper flexible sheet material layer 12 and force the dislodged fibers from sheet material layer 12 into lower sheet material layer 14 to interconnect these dislodged fibers from the upper sheet material layer 12 and secure them to the lower sheet material layer 14. Optionally, needles 90 on the lower portion of the needle punching device 86 dislodge fibers form the lower sheet material layer 14 and force the dislodged fibers upwardly through the clay layer 16 to interconnect the dislodged fibers from lower sheet material layer 14 to the upper sheet material layer 12, thereby interconnecting the upper and lower sheet material layers 12 and 14. If needles 90 are used, the lower fabric layer 14 should also be a non-woven fabric layer. After consolidation by needle-punching device(s)

86 and/or 92, adhesive 93 can be applied from liquid adhesive supply vessels 94 and/or 96 on the upper and/or lower fabric layers 12 and/or 14 (FIG. 3).

Figure 4:
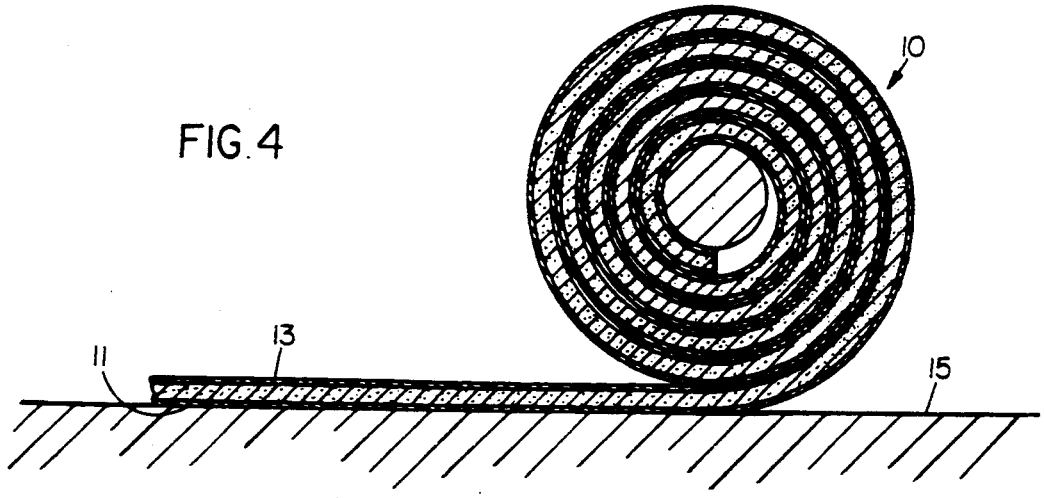
FIG. 4 is a side view of a modified water barrier, including an upper layer of another water barrier material, being installed to a plaza deck.

As shown in FIG. 4, the multi-layer article of manufacture can be secured on its outer surfaces to a lower layer 11 and/or an upper layer 13 of another water-barrier material, such as a polyolefin e.g., polyethylene or polypropylene sheet material, or the polybutene or polypropene compositions disclosed in this assignee's U.S. Pat. Nos. 4,534,925; 4,534,926 and 4,668,724, hereby incorporated by reference. The composite article of FIG. 4 is particularly suitable for securing to a plaza deck 15, or other concrete surfaces, and provides new and unexpected waterproofing.

The water-swellable colloidal clay utilized as the sandwiched clay layer 16 between flexible sheet material layers 12 and 14 of the multi-layered articles of the present invention is any water-swellable colloidal clay which will hydrate in the presence of water, i.e., will swell in the presence of water. In accordance with one important embodiment of the present invention, the colloidal clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations, such as magnesium and iron. There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorire and Saponite. To achieve the full advantage of the present invention, the colloidal clay, i.e., sodium bentonite, generally is finely divided as known for use in water barrier panels and the like, i.e., 4 to 350 mesh, U.S. Sieve Series, preferably 10 to 50 mesh.

In accordance with another embodiment of the present invention, a water-soluble adhesive can be applied to one or both fabric layers for temporarily increasing the tensile properties of the multi-layer article, particularly the shear strength, during handling and installation. After installation, and after the article has been thoroughly wetted, the water-soluble adhesive will dissolve to weaken the interconnection of the two fabric layers to permit greater swelling of an intermediate, water-swellable clay layer, thereby better filling void spaces in an area of potential water flow and forming a thicker article upon hydration. Any water-soluble adhesive, preferably applied from an aqueous solution, and preferably dried to less than about 10% moisture of the fabric area that has absorbed the adhesive solution, during manufacture, is suitable for this embodiment. As shown in FIG. 3, a heater, microwave energy, or other drying device(s) 98 can be installed above and/or below the finished product, prior to rolling, to substantially dry the applied adhesive (water-insoluble or water-soluble). These heaters 98 also can be used to bond any heat-bondable fibers that optionally are added to the product during manufacture, or contained within the fabric layers 12 and 24. Typical water-soluble adhesives include the animal glues derived from collagen, having an adhesive concentration in the range of about 0.1% to about 50% active glue material (dissolved or dispersed solids content), that dissolve in warm water (at least about 50° C.). Cosolvents, such as glycerol, glycols, acetic acid, and the like can be added to the adhesive solution to aid in solubilizing the glue material.

In this water-soluble adhesive, temporary strengthening embodiment, it is preferable to interconnect the two fabric layers less strongly, with fewer needle punches or fewer sewn points so that the fabrics can be more easily spaced by hydration of the intermediate water-swellable clay layer after installation. The applied adhesive, together with some needle punch or sewing interconnections, will provide sufficient strength for handling and installation.

In accordance with another embodiment of the present invention, meltable and/or heat or chemically shrinkable fibers can be added to the product onto, under or within the fabric layers 12 and/or 24, or within the clay layer, and these added fibers can be heat or chemically bonded together, for example, using heater(s) 98, to further strengthen, structurally reinforce, provide stretchability or stiffen the product 10. Such meltable and/or chemically shrinkable fibers can be used instead of or in addition to the water-soluble or water-insoluble adhesive. Examples of some of these added fibers can be any thermoplastic fibers such as RAYON, polypropylene, polyesters, NYLON, acrylic polymers and copolymers, ceramic fibers, fiberglass, propylene-ethylene copolymers, polypropylene-polyamide copolymers, a single monofilament, polyethylene, polyurethane fibers, dissolvable, e.g., polyvinyl alcohol fibers, and the like. Also, reinforcing structures, e.g., supplied from roll or spool, can be included, such as monofilaments, biaxially oriented netting, geo grids, geo nets, extruded netting, woven materials, spun-bonded materials, and the like. Bonding of these added fibers and reinforcing structures could be achieved by needle punching, adhesively, heat, ultrasonically, chemically or any combination thereof. As shown in FIG. 3, heat or chemically meltable or shrinkable fibers can be added under or over either or both fabric layers 12 and 14 from any one or all fiber/roll dispensing stations 100 for additional strength and/or stiffness. Also, various fibers may be added to the non-woven layer(s) 12 during manufacture of the non-woven layer(s). Such fibers alternatively can be chemically bonded by applying a chemical solution capable of searing adjacent fibers together, e.g., by softening and/or shrinking adjacent fibers that thereafter adhere to each other after chemical reaction, by hardening together via drying or oxidation. Chemical solution dispenser(s) 102 (FIG. 3) can be used to dispense chemical solution to the product for chemically searing or chemically shrinking the added fibers.

Additionally, an aperture slitting or punching device can be included to slit or punch apertures into one or both fabrics 12 and/or 24 over a portion of either or both fabric outer surfaces or over the entire upper and/or lower fabric surface(s) to provide bleed-through or extrusion of a water-swellable clay contained between the fabrics 12 and 24. The apertures or slits can be formed mechanically, ultrasonically, by impact with solids or liquids, e.g., using a water jet, laser, or gas jet, or by sand blasting. Extrusion of the water-swellable clay through the fabrics is particularly desirable along edges to seal between adjacent water-sealing products and between overlapped products.

In accordance with another important embodiment of the present invention, in addition to the water barrier characteristics of the multi-layer articles of manufacture of the present invention, the articles may be manufactured to include instead, or in addition to the water-swellable clay, a material capable of removing or interacting with one or more water-soluble contaminants from the water penetrating the outer fabric layer.

Some of the most prevalent contaminants found in waste waters contained in ponds, lagoons, areas of subterranean structure and other water-releasing areas, particularly where these areas include industrial waste waters, are heavy metal ions and water-soluble organic materials. It is well known in the prior art that natural and synthetic zeolites are capable of removing a substantial portion of the heavy metal ions from a waste water solution and that organophilic clays are capable of removing water-soluble organic materials from solution. However, the prior art suggests that removal of these materials from waste water streams should be done on-stream, treating the entirety of the waste water stream in order to remove these materials, requiring frequent replacement of treating materials because of the heavy volumes of waste water that pass through the zeolites or through the organophilic clays in order to clarify these waste water streams.

In accordance with an important feature of the present invention, it has been found that by including a layer of a natural or synthetic zeolite or by including a layer of an organophilic clay with or without a layer of a water-swellable clay, such as bentonite, and/or applying a layer of the mixture of water-swellable clay with the zeolite or organophilic clay in the articles of manufacture of the present invention, the water-swellable clay will expand upon hydration and the zeolite and/or organophilic clay combined with the water-swellable clay will form a water-treatment layer wherein the zeolite and/or organophilic clay will last many times longer than it would if the entire waste water supply were treated with full contact of the entire volume of the waste water stream, since only that quantity of water will be treated that permeates the water-swellable clay.

In accordance with another important embodiment of the present invention, the contaminant interacting layer, comprising any contaminant adsorbent, absorbent, reactant, or contaminant neutralizing material can be supplied as a separate layer below or instead of the water-swellable clay layer so that the amount of material treated for the removal of contaminants is only that material which completely penetrates the water-swellable clay layer, as shown in FIG. 2.

In accordance with another important feature of the present invention, the contaminant removal material mixed with the water-swellable clay, as shown in FIG. 1, or supplied as a separate layer, as shown in FIG. 2, or included in the article of manufacture instead of the clay layer, can be any material capable of adsorbing, absorbing, reacting with for insolubilization or for neutralization, while keeping the contaminant water-soluble in order to substantially lessen or remove the contaminant characteristics of the contaminants originally present in the water contacting the article of manufacture. Examples of materials capable of removing or neutralizing contaminants that are present in water include absorbent fibers, such as microcrystalline cellulose; attapulgite clay; zinc ricinoleate absorbed on an absorbent fiber or other absorbent material; amorphous silica powder; synthetic calcium silicate; sodium alumino-silicate (type A sodium zeolite); maltodextran; sodium silica aluminares (note that all the above are absorbents). Other materials, such as adsorbents, include microcrystalline cellulose; silica hydrogel based compositions; attapulgites; synthetic sodium magnesium silicates; synthetic calcium silicates; silicon dioxide; acid activated clays; type A sodium zeolites; and the like provided as a separate layer or mixed with the absorbents and/or adsorbents. Other materials can be included such as an algicide, antimicrobial material, bactericide, disinfectant, and/or fungicides such as phenol; zinc undecylenate N.F.; acetyl tyridinium chloride N.F.X.III and the like.

Most preferred as the adsorbent, absorbent and/or reactant and/or neutralizing material are natural or synthetic zeolites and/or an organophilic clay, which is basically a montmorillonite clay that has been reacted with a quaternary organic material to make it hydrophilic and absorbent to organic contaminants.

The flexible sheet materials 12 and 14 are, for example, geotextile fabrics, and, when secured together by needle punching, at least one of the fabrics 12 or 14 is a non-woven fabric. Any suitable fabrics can be used for this purpose, particularly since the fabrics have no water-impermeability purpose other than to achieve proper installation of a layer of clay or other abrasive powder or granular material 16, optionally with a predetermined degree of clay bleed-through after installation. Suitable fabrics include woven and non-woven permeable and non-permeable fabrics made from polypropylene, polyesters, nylon, propylene-ethylene copolymers, polypropylene-polyamide copolymers, and the like. The geotextile fabrics are preferred for their bacteriological and chemical resistance but the fabrics can be biodegradable since, once positioned, the fabrics may have no importance. Preferably, the fabrics should not contain glass fibers due to their susceptability to breakage during the needling process as disclosed in U.S. Pat. Nos. 3,608,166; 4,113,535; and 4,847,140. Preferably, the article of the present invention also does not include mobile fibers, as disclosed in U.S. Pat. Nos. 3,719,546, during manufacture. The thickness of the fabric is not important and such fabrics generally are available in thicknesses of about 3 to about 30 mils, or about one to about 50 ounces of material per square yard.

It has been found that by lubricating a surface of the water-swellable clay (bentonite) layer directly beneath a non-woven fabric layer prior to needle punching the article together, using approximately 2 ounces of water per square foot of bentonite clay surface area, with a bentonite layer of about 18 ounces of clay per square foot having a thickness of about $\frac{1}{4}$ inch, the following advantages were realized in comparison to the manufacture of the same product without lubrication water:

| Needle Wear & Breakage | Lubricated Clay Surface | Non-Lubricated Clay Surface |
| --- | --- | --- |
| % Needles Replaced | 33% | 100% |
| Frequency Replaced: Linear feet manufactured prior to replacement | 7000 | 2500 |
| Production Speed | X + 35% | X |
| Consistent Thickness | 35% more consistency | |
| Overall Thickness of Mat | Z − 5% | Z |

The lubrication of the clay surface resulted in a faster and easier needle penetration and resulted in much less vibration being experienced by the multi-layer articles of the present invention during manufacture. Vibration tends to cause an even layer of powdered or granular material to shift position and accumulate in localized areas on the lower fabric material during manufacture, particularly during needle punching. By lubricating the needle penetration in accordance with the present invention, the vibration experienced during manufacture was substantially lessened, and the clay surface was heavier resulting in a product with a consistent, even layer of clay, or other abrasive material, having a constant thickness. Further, needle lubrication enables faster production due to the ease of needle penetration, and enables the production of multi-layer articles having a reduced thickness (a denser product) since the upper and lower fabrics can be sewn or needle punched together more tightly. The application of lubricating water enabled production of needle punched articles containing bentonite clay to rise from about 120,000 ft.$^2$ per week to about 200,000 ft.$^2$ per week.

The amount of lubricant, e.g., water, should be at least about 0.1% based on the dry weight of the intermediate layer of abrasive material, e.g., bentonite clay, and should be less than that amount which would necessitate an additional drying step, e.g., less than about 40% based on the dry weight of the intermediate layer of abrasive material. The preferred amount of lubricant is about 5% to about 25% based upon the dry weight of the clay being lubricated, sprayed onto the surface of the layer of clay or other abrasive material, but any method of wetting the clay surface can be used in accordance with the principles of the present invention. Best results are obtained by spraying the surface of a bentonite clay layer with about 10% to about 20% water, based on the dry weight of the clay, especially about 10% to about 15% by weight water, based on the dry clay weight, to avoid excessive weight in the finished product.

As shown in FIG. 6, at least one major outer surface of one of the fabric layers, preferably the outer surface of the woven fabric layer 12, is coated with a water-insoluble adhesive 93, after needle punching the spaced fabric layers together surrounding the intermediate water-swellable clay, e.g., sodium bentonite, layer to provide a surprising increase in tensile strength of the multi-layer article. The water-insoluble adhesive is applied in liquid form preferably using an aqueous carrier, e.g., in an emulsion or other dispersion, in an amount of at least about 0.001 grams of dispersion per square foot of fabric surface area, and can be applied to one or both major outer surfaces of the fabric layers. Preferably, the adhesive is applied in an amount such that the adhesive does not completely penetrate the fabric layer(s) to contact the intermediate clay layer, e.g., about 0.01 gram to about 15.0 gm/ft$^2$ of outer fabric surface area coated. The adhesive should be water-insoluble after drying on the surface of the fabric layer (dissolves less than 0.5 gram in 100 ml. of 25° C. water) so that upon water contact, the additional tensile and shear strength imparted by the adhesive is not lost.

One suitable water-insoluble adhesive that can be applied from an aqueous carrier, as an aqueous emulsion, is an acrylic emulsion called RHOPLEX® TR-407 from Roban & Haas Company, Philadelphia, Pa. 19105, supplied as an emulsion having 45.5% solids that can be diluted before coating. Other water-insoluble adhesives can be used as well, such as the epoxy; phenolic; and a high temperature resistant polyimide formed by the reaction of an aromatic anhydride and an aromatic imine; urethane adhesives, and the like. Strengthening materials such as sand, chopped fiber and the like can be added to the surface coating of adhesive to increase the coefficient of friction in the coated surface of the multi-layer article in an amount of, e.g., about 1% to about 20% based on the weight of the adhesive composition.

One or more additional water-impermeable layers, such as high density polyethylene layers 110 and/or 112, can be applied to the upper and/or lower surface of the product after needle punching or sewing, secured by adhesive from adhesive supply vessels 94, 96.

It should be understood that the present disclosure has been made only by way of preferred embodiments and that numerous changes in details or construction, combination and arrangement of parts can be resorted to without departing from the spirit and scope of the invention as hereunder claimed.

What is claimed is:

1. A multi-layer article of manufacture comprising a pair of flexible fabric layers having a layer of powdered or granular abrasive material sandwiched therebetween, said pair of fabric layers structurally interconnected one to the other with continuous, elongate fibers to confine the abrasive material therebetween, and wherein at least one of the flexible fabric layers includes a partially penetrated coating of an adhesive in an amount sufficient to increase the shear strength of the article, but insufficient to completely penetrate the fabric layer.

2. A multi-layer article of manufacture useful as a waterproofing material comprising a pair of flexible sheet material layers having a layer of powdered or granular abrasive material sandwiched therebetween, said pair of sheet material layers structurally interconnected one to the other by sewing or needle punching to confine the abrasive material therebetween, and thereafter binding an outer surface of one of the sheet material layers by applying an adhesive to additionally strengthen the sewing or needle bond interconnection in an amount sufficient to increase the shear strength of the article but insufficient to substantially coat the abrasive material.

3. The article of claim 2, wherein the pair of flexible sheet material layers are interconnected with fibers, filaments or strands of flexible material from one of the sheet material layers secured to the other sheet material layer at spaced locations over essentially the entire internal surface area of said other sheet material layer to structurally secure the intermediate layer between the flexible sheet material layers.

4. The article of claim 3 including dislodging fibers from the upper sheet material layer and securing the dislodged fibers to the other layer of sheet material with a water-insoluble adhesive to interconnect the upper and lower sheet material layers, and wherein the abrasive material is a water-swellable clay.

5. The article of claim 2 further including binding the edges of the article to prevent a substantial amount of clay from falling out of the edges of the article.

6. The article of claim 2, wherein one of the upper and lower sheet material layers is a woven fabric layer.

7. The article of claim 6, wherein the abrasive material has been wetted with water in an amount of at least about 0.1 ounce of water per square foot of surface area prior to sewing or needle punching.

8. The article of claim 2, wherein the upper and lower sheet material layers have a weight of about one to about 50 ounces of material per square foot.

9. The article of claim 2 further including a layer of flexible water-impermeable material substantially coextensive with and adhered to one of the sheet material layers.

10. The article of claim 9, wherein the layer of water-impermeable material is a polymeric sheet material adhesively secured to an upper sheet material layer.

11. The article of claim 9, wherein the layer of water-impermeable material is a mixture of a water-swellable clay and polypropene or polybutene as a cohesive, sticky layer.

12. The article of claim 2, wherein the article further includes a reinforcing structure formed from a plurality of interconnected polymeric fibers and supplied from a roll or spool.

13. The article of claim 12, wherein the reinforcing structure is selected from the group consisting of a polymeric netting; a geo grid; a geo net; woven and spunbonded materials.

14. A multi-layer article of manufacture comprising a pair of flexible fabric layers having a contaminant-interacting layer of material sandwiched therebetween, said contaminant-interacting layer capable of interacting with water-soluble contaminants from water contacting said layer, said pair of fabric layers structurally interconnected one to the other with fibers to confine the contaminant-interacting material layer therebetween, wherein one of the flexible fabric layers includes an adhesive in an area of the interconnecting fibers and in an amount sufficient to increase the shear strength of the article.

15. The article of claim 14, wherein the pair of flexible sheet material layers are interconnected with fibers, filaments or strands of flexible material secured to both fabric layers at spaced locations over essentially the entire major areas of both fabric layers to structurally secure the intermediate contaminant-interacting material layer between the flexible fabric layers.

16. The article of claim 14, wherein the contaminant-interacting layer is selected from the group consisting of a contaminant adsorbent material, contaminant absorbent material, contaminant reactant material, contaminant ion-exchange material, contaminant neutralizing material and combinations thereof.

17. The article of claim 16, wherein the contaminant-interacting material is selected from the group consisting of a zeolite, an organophilic clay, and combinations thereof.

18. The article of claim 17, wherein the contaminant-interacting material is an ion-exchange material.

19. The article of claim 14, wherein the article further includes a water-swellable clay between said sheet material layers.

20. The article of claim 19, wherein said water-swellable clay is admixed with said contaminant-interacting material.

21. The article of claim 19, wherein said clay is provided as a separate layer disposed on a downstream side of the contaminant-interacting material.

22. A multi-layer article of manufacture useful as a waterproofing material comprising a pair of flexible sheet material layers having a layer of powdered or granular abrasive material sandwiched therebetween, said pair of sheet material layers structurally interconnected one to the other by sewing or needle punching to confine the abrasive material therebetween, and thereafter binding an outer surface of one of the sheet material layers by bonding together thermoplastic fibers contained within said one sheet material layer, after sewing or needle punching, to additionally strengthen the sewing or needle bond interconnection.

23. The multi-layer of claim 22, wherein the thermoplastic fibers are bonded together by melting together adjacent fibers.

24. A method of manufacturing a multi-layers article including a lower layer of fabric, an upper layer of fabric and an intermediate layer of a powdered or granular abrasive material secured between the fabric layers by needle punching or sewing, the improvement comprising applying a lubricating-effective amount of a liquid to a surface of the layer of abrasive material to lubricate the penetration of a needle through the layer of abrasive material, thereby reducing needle wear and breakage and providing consistent, effective securing of the upper and lower fabric layers surrounding an essentially constant thickness of said abrasive material, and thereafter binding an outer surface of one of the fabric layers by applying an adhesive to at least one of the fabrics during manufacture such that the adhesive bridges an area between essentially horizontally disposed fabric fibers and essentially vertically disposed securing fibers to increase the shear strength of the article essentially without coating the intermediate abrasive particles with said adhesive.

25. The method of claim 24, wherein the abrasive material is bentonite clay and the lubricating liquid comprises water and the water is applied to the needles or to the clay surface area initially penetrated by said needles.

26. The method of claim 25, wherein the water is applied over substantially an entire surface area of the clay layer on the clay surface first contacted with the needles, at a rate of at least about 0.1 ounce of water per square foot of clay surface area.

27. The method of claim 26, wherein the water is applied at a rate of about 0.1% to about 40% based on the dry weight of the intermediate clay layer.

28. The method of claim 24, wherein at least one of the fabric layers is a non-woven fabric.

29. A method of preventing water from contacting a structure comprising installing a multi-layer article of manufacture against said structure; said multi-layer article including first and second sheet material layers having a layer of water-swellable clay therebetween, said first and second sheet material layers secured together on opposite sides of the clay layer by needle punching or sewing, and thereafter applying a water-insoluble adhesive to at least one of the sheet material layers during manufacture such that the adhesive bridges an area between essentially horizontally disposed sheet material fibers and essentially vertically disposed securing fibers to increase the shear strength of the article.

30. The method of claim 29, wherein at least one of the first and second sheet material layers is a non-woven fabric, and wherein the other sheet material layer is coated with the adhesive.

* * * * *